(12) United States Patent
Berg

(10) Patent No.: US 7,192,100 B2
(45) Date of Patent: Mar. 20, 2007

(54) POWER MACHINE HAVING TRACTION LOCK WITH SPEED-RANGE SELECTOR

(75) Inventor: Gerald M. Berg, Lisbon, ND (US)

(73) Assignee: Clark Equipment Company, Montvale, NJ (US)

( * ) Notice: Subject to any disclaimer, the term of this patent is extended or adjusted under 35 U.S.C. 154(b) by 0 days.

(21) Appl. No.: 10/951,074

(22) Filed: Sep. 27, 2004

(65) Prior Publication Data
US 2006/0071541 A1  Apr. 6, 2006

(51) Int. Cl.
*B60R 28/08* (2006.01)
*B60T 17/16* (2006.01)

(52) U.S. Cl. .................. 303/89; 188/18 R; 188/69
(58) Field of Classification Search .......... 188/18 R, 188/29, 31, 68, 69; 303/89
See application file for complete search history.

(56) References Cited

U.S. PATENT DOCUMENTS

| | | | | |
|---|---|---|---|---|
| 3,601,231 A | * | 8/1971 | Kolacz et al. ................ | 188/69 |
| 4,132,121 A | | 1/1979 | Clarke ..................... | 74/230.17 |
| 4,176,560 A | | 12/1979 | Clarke ..................... | 74/230.17 |
| 4,209,988 A | | 7/1980 | Langworthy et al. ......... | 60/431 |
| 4,416,460 A | * | 11/1983 | Morris ........................ | 280/3 |
| 5,425,431 A | | 6/1995 | Brandt et al. ............... | 180/273 |
| 5,551,523 A | | 9/1996 | Berg et al. .................. | 180/273 |
| 5,711,391 A | | 1/1998 | Brandt et al. ............... | 180/273 |
| 5,992,576 A | * | 11/1999 | Berg et al. ................... | 188/69 |
| 6,189,646 B1 | | 2/2001 | Brandt et al. ............... | 180/273 |
| 6,250,433 B1 | * | 6/2001 | Sealine et al. ................ | 188/69 |
| 6,361,469 B1 | * | 3/2002 | Roder et al. .................. | 477/24 |
| 2002/0100658 A1 | * | 8/2002 | Williams et al. ............ | 192/220 |
| 2003/0070859 A1 | | 4/2003 | Dahl et al. .................. | 180/305 |

FOREIGN PATENT DOCUMENTS

JP       2002 013425        1/2002

OTHER PUBLICATIONS

Beck, J., "Mobile Ladegeraete Hydraulisch Antreiben/Elektronisch Steuern," O+P Olhydraulik Und Pneumatik, Vereinigte Fachverlage, Mainz, DE, vol. 42, No. 2, Feb. 1998, pp. 95-99.
International Search Report and Written Opinion from Application No: PCT/US2005/033892, filed Sep. 20, 2005.

* cited by examiner

*Primary Examiner*—Devon Kramer
(74) *Attorney, Agent, or Firm*—Westman, Champlin & Kelly, P.A.

(57) ABSTRACT

A self propelled power machine is provided with a drive system and a traction lock mechanism. The drive system includes a speed range selector and associated mechanism that can operate the power machine in high and low speed ranges. The traction lock mechanism, when applied stops the drive system from moving the wheels of the power machine. A controller insures the drive system is in the low speed range prior to engaging the traction lock mechanism. The controller determines whether the drive system is operating in a low speed range or a high speed range. If the drive system is in the high speed range, the controller places the drive system in the low speed range and the controller then applies the traction lock after a short time delay to provide some dynamic slowing of the drive. If the system is already in the low speed range, the drive system remains there and the controller applies the traction lock.

7 Claims, 3 Drawing Sheets

POWER MACHINE HAVING TRACTION LOCK WITH SPEED-RANGE SELECTOR

BACKGROUND OF THE INVENTION

The present disclosure relates to self propelled power machinery. More particularly, the present disclosure relates to an apparatus for controlling speed range and braking in a power machine.

Power machines, such as skid steer or wheel loaders, can usually be found in many different construction sites. Loaders typically include a movable lift arm that can support a wide variety of interchangeable work tools such as a bucket or an auger. Most power machines also include a drive system that includes wheels or tracks for propelling the power machine.

The drive system is typically powered with an engine that operates a pair of hydraulic pumps that are each connected to hydraulic traction motors that, in turn, power movement of the wheels. Many power machines are equipped with speed range mechanisms that are capable of operating the power machine in one of a number of speed ranges, such as in high and low speed ranges. An operator can select the low speed range when traversing difficult terrain or operating a sensitive tool. The operator can also select a different speed range, such as a high speed range, when simply driving down a road.

It is desirable that under certain circumstances the power machine be positively stopped. Many power machines are equipped with a traction lock mechanism that stops the drive system from moving the wheels. The traction lock mechanism can be operated by the user, automatically, or both. One example of such a system is described in U.S. Pat. No. 5,551,523, which is incorporated by reference. There is a continuing need, however, to develop efficient and durable traction lock mechanism systems in power machines, including power machines having multiple speed ranges.

SUMMARY OF THE INVENTION

The present invention relates to a power machine having a multiple speed drive system and traction lock mechanism. The drive system includes a speed range mechanism that can operate the power machine in at least high and low speed ranges. The traction lock mechanism is operable to stop the drive system from moving the wheels or tracks of the power machine when a brake is applied. A controller receives a signal when the brake is applied and places the drive system in the low speed range prior to engaging the traction lock mechanism.

For example, the controller determines whether the drive system is operating in a low speed range or a high speed range. If the drive system is in the high speed range, the controller places the system in the low speed range and the controller then applies the traction lock. If the system is already in the low speed range, the drive system remains there and the controller applies the traction lock.

In one aspect, the disclosure describes a power machine having a drive system with a speed range mechanism including a speed range selector. The speed range mechanism selectively operates the power machine in high and low speed ranges (and possibly other ranges as well). The power machine also includes a traction lock mechanism adapted to stop the drive system from moving the power machine. The power machine also includes a brake control circuit receiving a brake input (indicating a desire to activate the traction lock mechanism) from at least one source, such as from a traction lock switch in the cab of the power machine. The brake control circuit provides a controller with a brake output signal in response to the brake input. The controller is adapted to provide a controller output to the traction lock mechanism and to the speed range selector mechanism in response to the brake output. The controller output is provided when the power machine is operating in a speed range that is not the low speed range, such as the high speed range, and includes selecting the low speed range and preferably after a short time delay activating the traction lock mechanism.

In still another aspect, the disclosure includes a process for use with a power machine having a drive system with selectable high and low speed ranges and a traction lock mechanism. The process includes receiving a brake input signal. In response to the brake input signal, a determination is made as to whether the power machine is in a low speed range. If the power machine is in the low speed range, the traction lock mechanism is applied. If the power machine is not in the low speed range, such as in the high speed range, the low speed range is selected and the traction lock is selected.

DETAILED DESCRIPTION OF THE PREFERRED EMBODIMENTS

Figure 1:
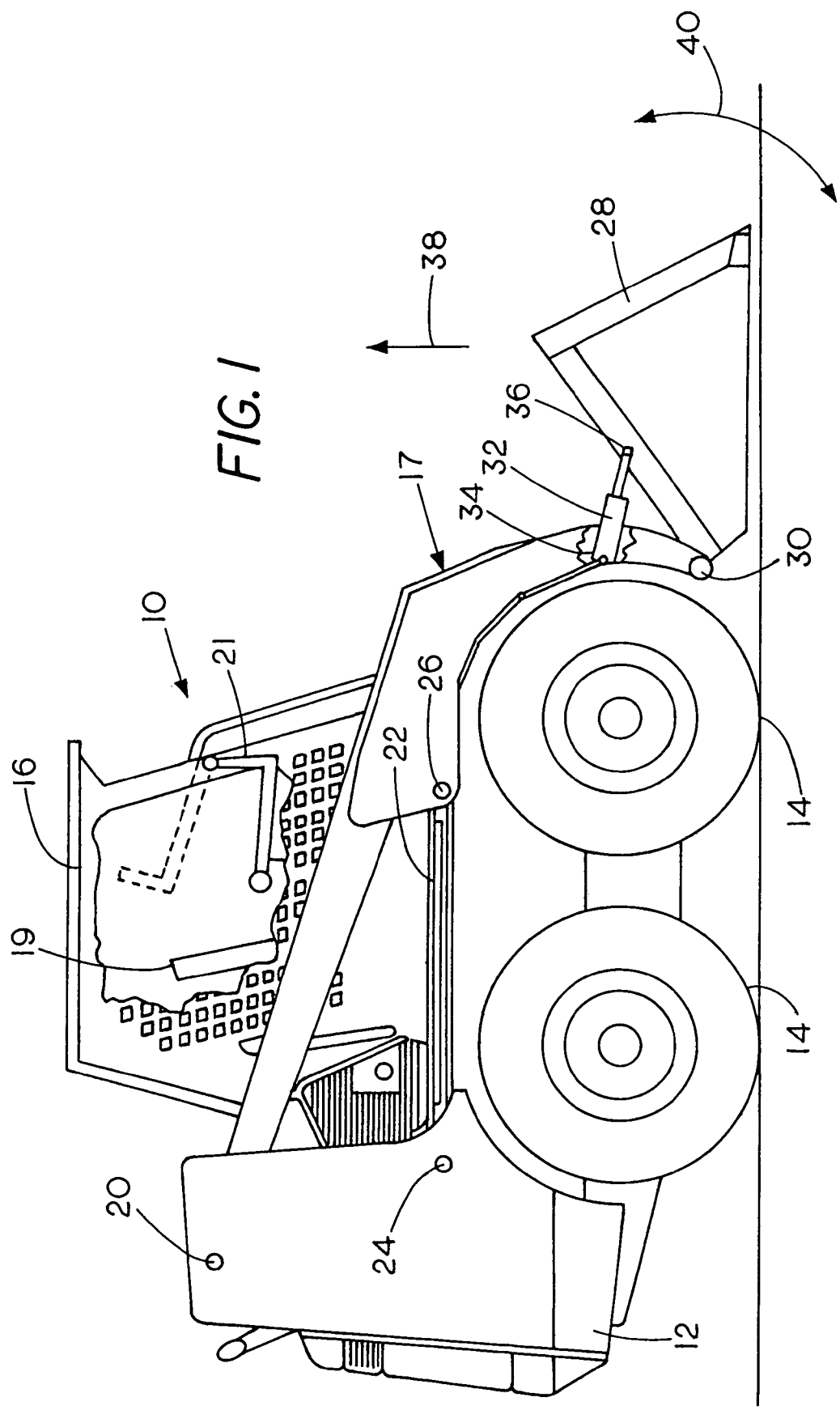
FIG. 1 is a side elevation view of a typical power machine incorporating features of the present disclosure.

FIG. 1 shows a side elevation view of a skid steer loader 10, which is one example of a power machine. The skid steer loader 10 includes a frame 12 supported by wheels 14. The frame 12 also supports a cab 16 that defines an operator compartment that substantially encloses a seat 19. An operator sits on the seat 19 to control the skid steer loader 10. A seat bar 21 is coupled to a portion of the cab 16. When the operator occupies seat 19, the operator then pivots seat bar 21 from the raised position, shown in phantom, to the lowered position shown in FIG. 1.

A lift arm 17 is coupled to frame 12 at pivot points 20, one of which is shown in the figure, the other of which is disposed on the opposite side of the skid steer loader 10. A pair of hydraulic cylinders 22, again only one of which is shown, is pivotally coupled to the frame 12 at pivot points 24 and to lift arm 17 at pivot points 26. The lift arm 17 is also coupled to a working tool that, in the illustration, is a bucket 28. The lift arm 17 is pivotally coupled to the bucket 28 at pivot points 30. Another hydraulic cylinder 32 is pivotally coupled to the lift arm 17 at pivot point 34 and to bucket 28 at pivot point 36. While only one cylinder 32 is shown, it is to be understood that any desired number of cylinders could be used to work bucket 28 or any other suitable tool.

The operator in the cab 16 can manipulate the lift arm 17 and bucket 28 by selectively actuating hydraulic cylinders 22 and 32. By actuating cylinders 22 and causing them to increase in length, the operator moves lift arm 17, and consequently bucket 28, generally vertically upward in the direction indicated by arrow 38. The bucket 28 moves generally vertically downward to the position shown in the figure when the operator actuates cylinder 22 and causes it to decrease in length.

The operator can also manipulate bucket 28 by actuating cylinder 32. The bucket 28 tilts forward about pivot points 30 when the operator causes the cylinder 32 to increase in length. Conversely, the bucket 28 tilts rearward about pivot points 30 when the operator causes cylinder 32 to decrease in length. The tilting is generally along an arcuate path indicated by arrow 40.

The loader 10 includes an engine (not shown) used to power systems including the lift arm and a drive system in a manner well known in the art. The drive system includes a pair of hydraulic pumps, such as a left pump and a right pump, coupled to the engine. The left pump is coupled to a left hydraulic drive motor that is used to drive the wheels 14 on the left side of the loader 10. The right pump is coupled to a right hydraulic drive motor that is used to drive the wheels 14 on the right side of the loader 10.

The drive system receives a number of operator inputs to control the skid steer loader 10. Hand control levers located inside of the cab are one example of drive systems controls. The operator moves the hand control levers to control the speed and direction of the loader 10. The hand control levers often also include a neutral position that causes the loader 10 to stop. Another device included in the drive system and used to stop the loader is a traction lock system, or brake, that can override the hand control levers. The traction lock system is discussed below in greater detail with reference to FIG. 3. Still another feature of the drive system is a multiple speed range selector. The multiple speed range selector includes at least a high speed range and a low speed range. If the low speed range is selected, the loader can be operated between a first initial speed (which is often "stop") and a low maximum speed. If the high speed range is selected, the loader can be operated between a second initial speed (often "stop") and a high maximum speed, where the high maximum speed is greater than the low maximum speed. The drive system is also connected to a control circuit used to control operation of the loader 10.

Figure 2:
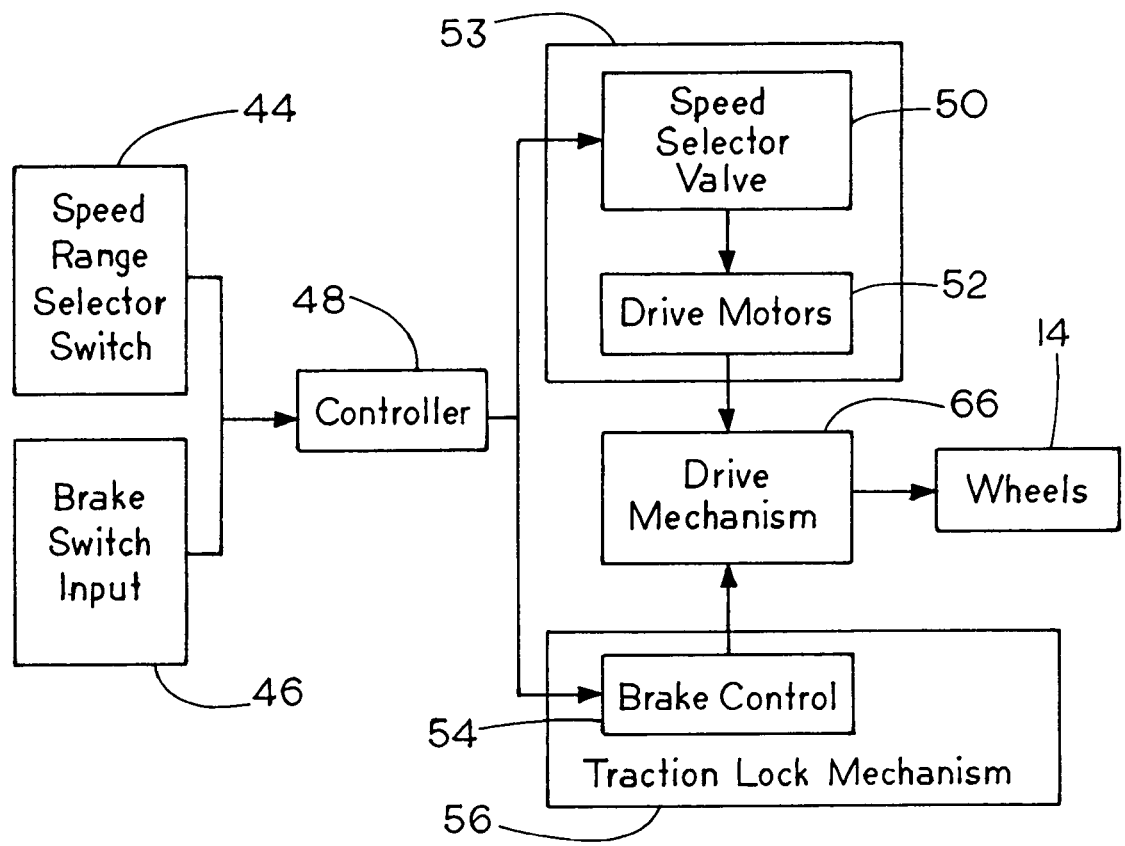
FIG. 2 is a schematic block diagram of a control circuit of the power machine of FIG. 1.

FIG. 2 illustrates a control circuit used in controlling the operation of a power machine, such as the skid steer loader 10. The control circuit includes a speed range selector switch 44 and brake switch input circuit 46 each providing an input signal to a controller 48, such as a logic controller. The controller 48 processes the inputs and can provide a useable output to a speed-selector valve 50, which in turn controls drive motor units 52, which forms part of the speed range mechanism 53; and to a brake control 54, which forms part of a traction lock mechanism 56. The drive motor units are pump and motor assemblies where the amount of the pump portion controls the motor speed.

The speed-selector switch 44 receives an input from the operator and provides an output to the controller 48 to place the power machine 10 in one of a plurality of speed modes, or speed ranges. For example, a power machine can be equipped with two speed ranges, i.e., a low speed range and a high speed range. In one example, the drive controls in the low speed range allow for finer positioning of the skid steer loader than in the high speed range. The operator can select the low-speed range for operating a sensitive tool or maneuvering difficult terrain, for example. The high speed range provides for more responsive drive controls, and an operator can select the high speed range for driving down a road, for example. The power machine can include additional operator-selectable speed ranges.

The brake switch input circuit 46 provides a signal to the controller 48 to stop the wheels 14 of the loader 10. A number of operator controlled, automatic, or otherwise, brake inputs can be provided to the brake switch 46 to indicate a desire to stop the loader 10. For example, the switch 46 can be connected to a seat bar sensor that indicates whether the seat bar 21 is in a lowered position and the operator occupies the seat 19. If the seat bar sensor indicates the seat bar 21 is in a raised position and the loader 10 is operational, the controller 48 may seek to stop operation of the loader 10. Other inputs to the brake switch input circuit 46 can include other operator-selected mechanisms, such as a cab mounted traction lock switch, used to indicate a desire to stop operation of loader 10 and activate the traction lock mechanism 56.

Figure 3:
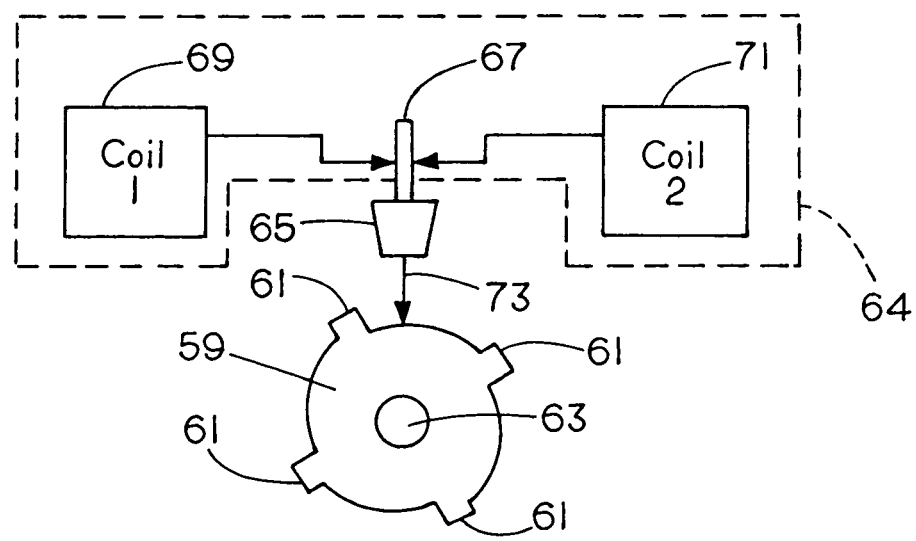
FIG. 3 is a schematic diagram of an example of a traction lock system for use in the power machine of FIG. 1 and operated by the control circuit of FIG. 2.

Based on a brake input received from the brake switch input circuit 46, the control 48 circuit provides an output to activate the traction lock mechanism 56. One example of a traction lock mechanism 56 is shown in FIG. 3. The traction lock mechanism 56 of the example includes a disc 59 having a number of lugs 61 mounted to a portion of the drive mechanism 66, such as an axle 63 (FIG. 3), or other drive train component, used to drive the wheels 14 of the loader 10. A wedge 65 is manipulated with a solenoid 64 including slug or plunger 67 that is coupled to two coils 69, 71. The solenoid 64 can correspond with the brake control 54, for example, described above. In one example, the coils 69, 71 are disposed one inside the other around plunger 67. When the wedge 65 is allowed to drop onto the disc 59, in the direction of arrow 73, the wedge becomes engaged by lug 61 and locks up the axle 63, precluding rotation of the axle 63 and thus precluding rotation of the wheels 14 and movement of the loader 10. When the wedge 65 is lifted from the path of the lugs 61 on the disc 59, the axle 63 is unlocked and the loader 10 is permitted to move.

Two coils 69, 71 of solenoid 64 include a first coil 69 (or pull coil) that is a relatively high current coil, which can be used to pull the wedge 65 up and away from the path of the lugs 61. When the wedge is clear of the lugs 61, the first coil 69 is de-energized and the second coil 71 (or hold coil) is energized to hold the wedge 65 out of the path of the lugs 61. The hold coil 71 in the example is a relatively lower current coil than the pull coil 69. Thus, the controller 48 provides an output to de-energize the hold coil 71 and allow the wedge to drop into the path of the lugs 61 thereby locking the drive mechanism 66, or to energize the pull coil to pull the wedge 65 out of engagement with the drive mechanism 66 and allowing the loader 10 to move.

Referring again to FIG. 2, the controller 48 also provides a useable output to the speed selector valve 50 that is coupled to the drive motors 52. The speed selector valve in the example is a two speed valve, or high/low valve. The valve is used to control hydraulic fluid in the drive motor units 52. When the operator selects a high speed mode, the valve 50 is set to a high speed setting that causes the drive motors to operate in a high range. When the operator selects the low speed mode, the valve 50 sets the drive to the drive motors 52 such that the speed range is lower. The maximum speed of the loader 10 is greater in the high speed mode than in the low speed mode.

Figure 4:
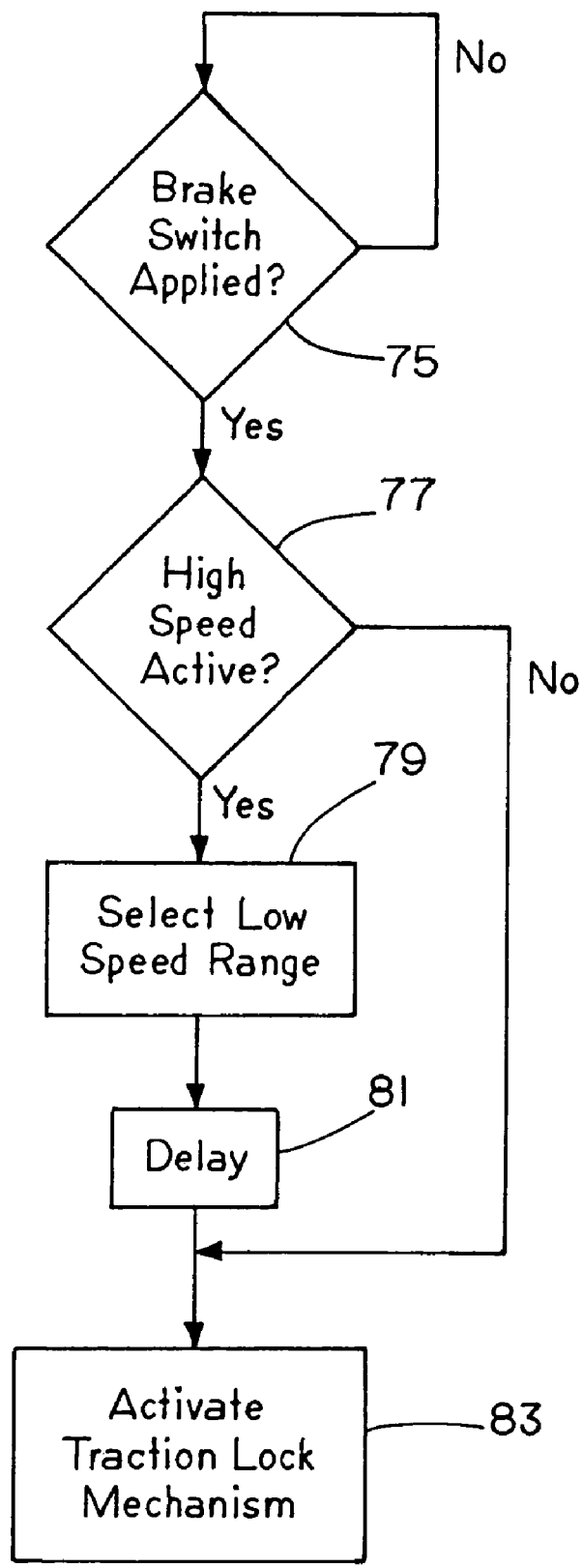
FIG. 4 is a flow diagram illustrative of a process applied by the control circuit of FIG. 2.

FIG. 4 shows an exemplary process applied in the controller 48 to operate the brake control 54 of the traction lock mechanism 56. During operation, the controller 48 is on standby to receive the input from the brake switch 46, as indicated in block 75. When the brake switch provides an input to the controller 48, the controller 48 determines whether the loader is operating in the high speed range as indicated at block 77. If the loader 10 is operating in the low speed range, the controller 48 activates the brake control 54 at block 83. In one variation, the controller 48 only provides a signal to the brake control 54 and not to the selector valve 50. If the loader 10 is operating in the high speed range, the controller 48 provides a signal to the selector valve 50 to place the drive motors 52 in the low speed range as shown at block 79. A short time delay is provided as indicated at block 81. The time delay in the example is a fraction of a second, and then the controller 48 applies the traction to the lock mechanism.

Several variations of the process of FIG. 4 are contemplated and a few are noted here. For example, one variation includes removing the determination of whether the loader is operating in the high speed range at block or stop 77. In this variation, the controller 48 can always provides a signal to the selector valve 50 to place the drive motors 52 in the low speed range, 79. If the drive motors 52 are already in the low speed range, the selector valve 50 does nothing, but the process still "selects the low speed range." The process of Figure shows step 77 performed after step 75, or in series.

In another variation block of steps 75 and 77 are performed at or about the same time, or in parallel. In still another variation, the controller 48 can provide two signals, one signal to the speed range mechanism 53 to select the low speed range and a second signal, through a time delay, to the traction lock mechanism 56. Still other variations are contemplated and intended to be within the scope of the invention.

The present invention thus slows the vehicle through operation of the speed range selector before the traction lock mechanism is engaged. The time delay is very short, after the lower speed is selected, before the traction lock is engaged. The traction lock is a positive lock to hold the drive from moving the power machine.

Although the present invention has now been described with reference to preferred embodiments, workers skilled in the art will recognize that changes may be made in form and detail without departing from the spirit and scope of the invention.

What is claimed is:

1. A power machine having a drive system, a speed range selector coupled to the drive system and adapted to selectively operate the power machine in at least high and low speed ranges, the low speed range operating between a first initial speed and a low maximum speed, and the high speed range operating between a second initial speed and a higher maximum speed than the low speed range, a drive control operably coupled to the drive system and configured to be manipulated by a user to cause the drive system to move the power machine and a traction lock adapted to stop the drive system from moving the power machine, the power machine comprising:
   a brake control circuit receiving a brake input and providing a brake output adapted to activate the traction lock, wherein the brake control circuit is independent of the drive control; and
   a controller operably coupled to the brake control circuit to receive the brake output, and adapted to provide a controller output signal to the traction lock and the speed range selector in response to the brake output;
   wherein the controller output signal is provided when the power machine is operating in a speed range that is not the low speed range and includes operating the speed range selector to select the low speed range and activating the traction lock.

2. The power machine of claim 1 wherein the traction lock includes a disc with a plurality of lugs adapted to engage a wedge selectively disposed within a path of the lugs.

3. The power machine of claim 1 wherein the controller is adapted to provide another controller output in response to the brake output when the power machine is operating in the low speed range, wherein the another controller output is received by the traction lock and not the speed range selector.

4. The power machine of claim 1 wherein the controller delays activating the traction lock until after the speed range selector has been actuated to select the low speed range.

5. A power machine having a drive system, including a drive mechanism having a low speed range that has a first maximum drive speed and a separate selectable high speed range with a second maximum drive speed higher than the first maximum drive speed and a drive control operably coupled to the drive system and configured to be manipulated by a user to cause the drive system to move the power machine, the power machine comprising:
   a traction lock mechanism adapted to stop the drive system;
   a speed range selector coupled to the drive mechanism and adapted to select one of the high speed and low speed range to drive the power machine in response to a signal;
   a brake control circuit receiving a brake input and providing a brake output adapted to activate the traction lock mechanism, wherein the brake control circuit is independent of the drive control; and
   a controller operably coupled to the brake control circuit to receive the brake output, and adapted to provide a controller output signal to at least one of the traction lock mechanism and the speed range selector in response to the brake output;
      wherein the controller output signal is provided to both the traction lock and speed range selector when the power machine is operating in the high speed range at the time the brake output is received whereby the speed range selector selects the low speed range for the drive mechanism and, after a delay, activates the traction lock mechanism, and
      wherein the controller output signal is provided to actuate the traction lock mechanism and is not provided to the speed range selector when the drive mechanism is in the low speed range.

6. The power machine of claim 5 wherein the delay is less than one second.

7. A process for use with a power machine having a drive system with a speed range selector that operates a drive mechanism to selectively drive the power machine in one of a high speed range and a low speed range having a maximum drive speed lower than the high speed range, and the drive system including a traction lock mechanism and a drive control configured to be manipulated by a user to cause the drive system to move the power machine, the process comprising:
   providing a brake control circuit configured to provide a brake signal, wherein the brake control circuit is independent of the drive control
   providing a controller for receiving the brake signal and a signal indicating the speed range selected;
   determining if the power machine is in a low speed range when the controller receives the brake signal;
   applying the traction lock mechanism to the drive system if the controller determines the power machine is in the low speed range when receiving the brake signal; and
   providing a signal from the controller to select the low speed range and thereafter applying the traction lock mechanism if the controller determines the power machine is in the high speed range when receiving the brake signal.

* * * * *